United States Patent
Wong

(10) Patent No.: US 9,901,839 B2
(45) Date of Patent: Feb. 27, 2018

(54) VEHICLE COMBINATION FOR PROVIDING ORIENTATION FREE STEERING

(71) Applicant: Ho Yin Wong, Hong Kong (HK)

(72) Inventor: Ho Yin Wong, Hong Kong (HK)

(73) Assignee: Ho Yin Wong, Tsui Wan Estate, Chai Wan ( * ) Notice: Subject to any disclaimer, the term of this patent is extended or adjusted under 35 U.S.C. 154(b) by 0 days.

(21) Appl. No.: 14/731,416

(22) Filed: Jun. 5, 2015

(65) Prior Publication Data
US 2017/0173484 A1    Jun. 22, 2017

(51) Int. Cl.
*A63H 30/04* (2006.01)
*G05D 1/00* (2006.01)
*G05D 1/02* (2006.01)
*H04L 29/08* (2006.01)

(52) U.S. Cl.
CPC .......... *A63H 30/04* (2013.01); *G05D 1/0011* (2013.01); *G05D 1/021* (2013.01); *H04L 67/125* (2013.01)

(58) Field of Classification Search
None
See application file for complete search history.

(56) References Cited

U.S. PATENT DOCUMENTS

| 6,113,459 A * | 9/2000 | Nammoto | A63H 17/36 446/431 |
| 2003/0114075 A1* | 6/2003 | Moll | A63H 30/04 446/456 |

* cited by examiner

*Primary Examiner* — Mussa A Shaawat
*Assistant Examiner* — Abdhesh Jha

(57) ABSTRACT

A vehicle combination for orientation free steering experience to a user includes a remote control unit to for sending rotational and speed signals and a vehicle unit moves in the direction for receiving the rotation and speed signals, and further moving in the direction decoded from the rotation and speed signals. The remote control unit includes transmits the rotational pulse and speed signals. The vehicle unit includes a receiver to decode the rotational pulse and the speed signal received from the transmitter and further converts the decoded rotational pulse to determine the steering power. The vehicle unit is further driven based on the steering power and a second power source to power the receiver and the motor unit. The rotational pulse generated from the remote control unit is directly proportional to the steering power decoded by the receiver.

7 Claims, 3 Drawing Sheets

VEHICLE COMBINATION FOR PROVIDING ORIENTATION FREE STEERING

BACKGROUND OF THE INVENTION

1. Field of the Invention

The present invention generally relates to a remote controlled car and more particularly relates to a vehicle combination providing orientation free steering to users.

2. Description of Related Art

It is known to control a d-c motor driven vehicle through a remote control unit containing batteries and switches which are connected wirelessly to the vehicle. Many children and adults enjoy remote control vehicles. Cars, planes, video games, helicopters and other electronic vehicles may provide a means for the user to remotely control the functions related to the operation of the vehicle.

The remote control is usually hand held with a means to execute commands related to the functionality of the controlled. The remote control uses Radio Frequency (RF) and Infrared (IR) signals directed to the vehicle that coincide with the desired functions. Most remote controls address all functionality associated with the vehicles. In the case of a car or vehicle, the remote control enables the user to at least control direction, start, stopping and speed of the vehicle. Other functions may include lights, horns, turn signals or features that may be included on the vehicle.

Various toys utilizing remote controls are miniature replica versions of actual vehicles, planes or likewise. Consequently, the child uses the remote to control the miniature vehicle or plane. In such a circumstance, a child of adequate age and maturity may use the remote control to manipulate the vehicle through a remote control.

Remote controls available in the market have fixed directions keys and are not oriented to be set according to the direction of the vehicle. Therefore, there is a need of a vehicle combination which provides an orientation free steering experience.

SUMMARY OF THE INVENTION

In accordance with the teachings of the present invention, a vehicle combination for providing orientation free steering is provided.

An object of the present invention is to provide a vehicle combination for orientation free steering experience to a user includes a remote control unit to for sending rotational and speed signals and a vehicle unit moves in the direction for receiving the rotation and speed signals, and further moving in the direction decoded from the rotation and speed signals.

The remote control unit includes a remote control housing handheld by the user, a first power source configured within the housing to provide power, at least one rotator unit powered by the first power source and operated by the user to generate a coded rotational pulse, one or more speed control switches to release speed signals, and a transmitter powered by the first power source to transmit the generated rotational pulse received from the rotator unit and further transmits the speed signals received from the speed control switches.

The vehicle unit includes a receiver to decode the rotational pulse and the speed signal received from the transmitter and further converts the decoded rotational pulse to determine the steering power, a vehicle housing, at least one wheel attached to the vehicle housing, a motor unit attached to the wheel to drive the vehicle housing based on the steering power and a second power source to power the receiver and the motor unit. The rotational pulse generated from the remote control unit is directly proportional to the steering power decoded by the receiver.

Another object of the present invention is to provide rotator unit with a rotator encoder to generate electrical signals, and a steering decoder to convert the electrical signals into coded rotational pulse. Further, in another object of the present invention the vehicle combination further includes one or more direction keys configured in the remote control housing to release directional signals for directing the movement of the housing, wherein the directional signals decoded by the receiver to determine the steering power.

Another object of the present invention is to provide the vehicle combination including a monostable circuit unit to control the timing of each rotational pulse generated from the rotator unit. Another object of the present invention is to provide the vehicle combination including a one or more visual unit configured in the housing to illuminate visual signals on receiving power from the second power source.

Another object of the present invention is to provide the vehicle combination including one or more audio units configured in the housing to release audio signals on receiving power from the second power source.

BRIEF DESCRIPTION OF DRAWINGS

The disclosure will provide details in the following description of preferred embodiments with reference to the following figures wherein.

Figure 1:
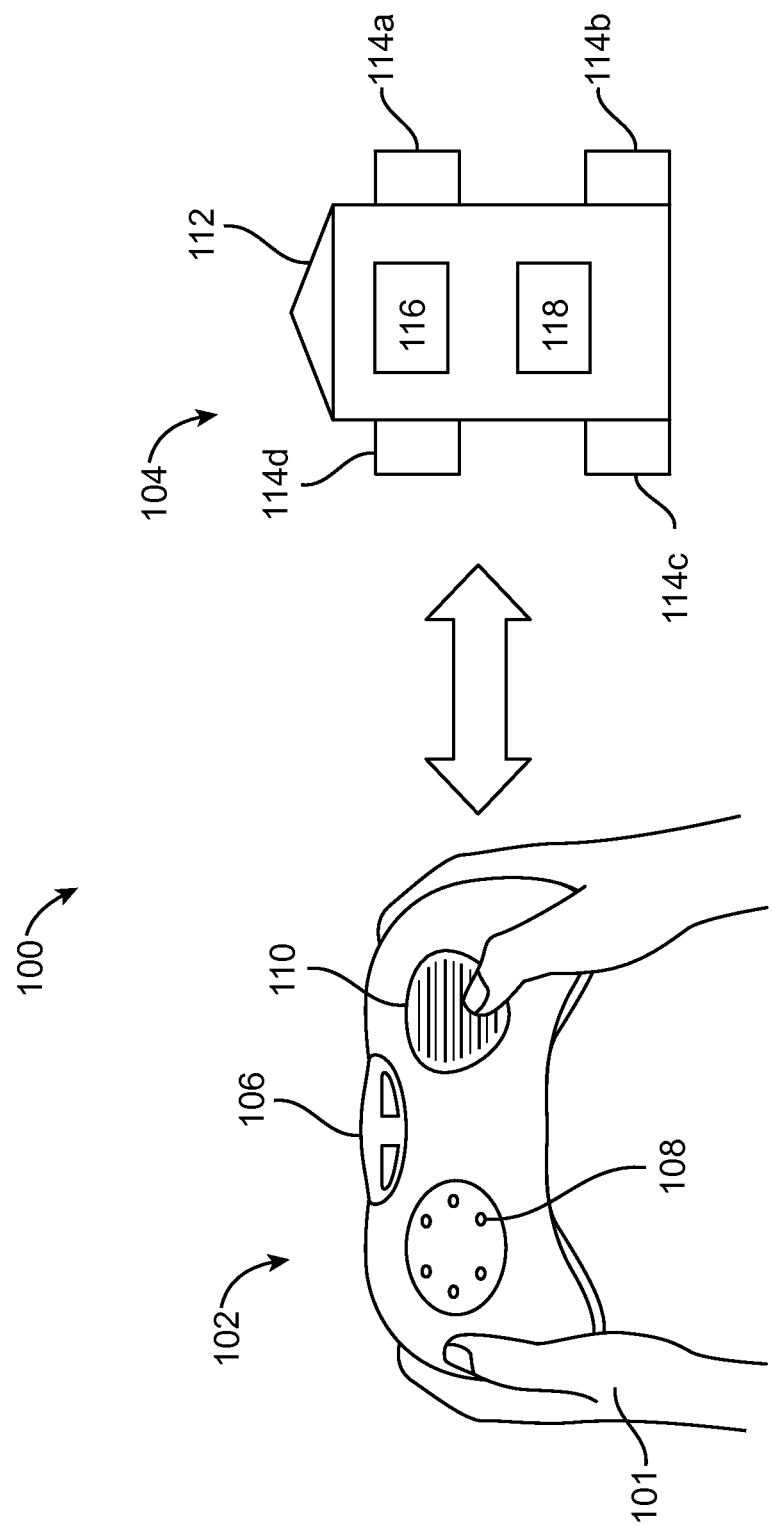
FIG. 1 illustrates a perspective view of a vehicle combination in accordance with a preferred embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE DRAWINGS

While this technology is illustrated and described in a preferred embodiment, vehicle combination for providing orientation free steering experience to a user may be produced in many different configurations, forms and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

Reference will now be made in detail to several embodiments of the invention which are illustrated in the accompanying drawings. Wherever feasible and convenient, the same reference numerals are used in the figures and the description to refer to the same or like parts. The drawings are in a simplified form and not to precise scale. For purposes of convenience and clarity only, directional terms, such as top, bottom, left, right, up, down, over, above, below, beneath, rear, and front may be used with respect to the accompanying drawings.

These and similar directional terms should not be strictly construed to limit the scope of the invention. In addition, words such as attached, affixed, coupled, connected and similar terms with their inflectional morphemes are used interchangeably, unless the difference is noted or made otherwise clear from the context. These words and expressions do not necessarily signify direct connections, but include connections through mediate components and devices.

FIG. 1 illustrates a perspective view of a vehicle combination 100 for providing orientation free steering experience to a user 101 in accordance with a preferred embodiment of the present invention. The vehicle combination 100 includes a remote control unit 102 for generating signals and a vehicle unit 104 for decoding the signals to determine the steering power.

The remote control unit 102 includes a remote control housing 106 handheld by the user 101, a first power source (not shown in FIG. 1) configured within the remote control housing 106 to provide power, at least one rotator unit 108 powered by the first power source (not shown in FIG. 1) and is operated by the user 101 to generate a coded rotational pulse.

Further, the remote control unit 102 includes one or more speed control switches 110 powered by the first power source (not shown in FIG. 1) to release speed signals, and a transmitter (not shown in FIG. 1) powered by the first power source (not shown in FIG. 1) to transmit the generated rotational pulse received from the rotator unit 108 and further transmits the speed signals received from the speed control switches 110.

In a preferred embodiment of the present invention, the shape of the remote control housing 106 is rectangular so that the control buttons are within easy reach of the user's fingers and/or thumbs. However, it would be readily apparent to those skilled in the art that various other shapes of the remote control housing 106 may be envisioned without deviating from the scope of the invention.

In another preferred embodiment of the present invention, the remote control housing 106 may also include handles and trigger grips. Further, the remote control housing 106 is made of hard plastic and has a smooth surface. Alternatively, the surface of the remote control housing 106 may be textured to enhance gripping.

In a preferred embodiment of the present invention, the rotator unit 108 and the speed control switch 110 are disk shaped. Generally, the user 101 places left thumb on the rotator unit 108 and rotates to produce the rotational pulse. The disk may be rotated in both clockwise direction (CW) and counter-clockwise direction (CCW).

The receiver (not shown in FIG. 1) decodes the rotational pulse and directional details and then drives the motor unit (not shown in FIG. 1) to move the wheels 114 and the housing 112 in the direction of rotation of the rotator unit 108 rotated by the user 101. The steering angle of the wheel 114 is controlled by the motor unit (not shown in FIG. 1).

Figure 3:
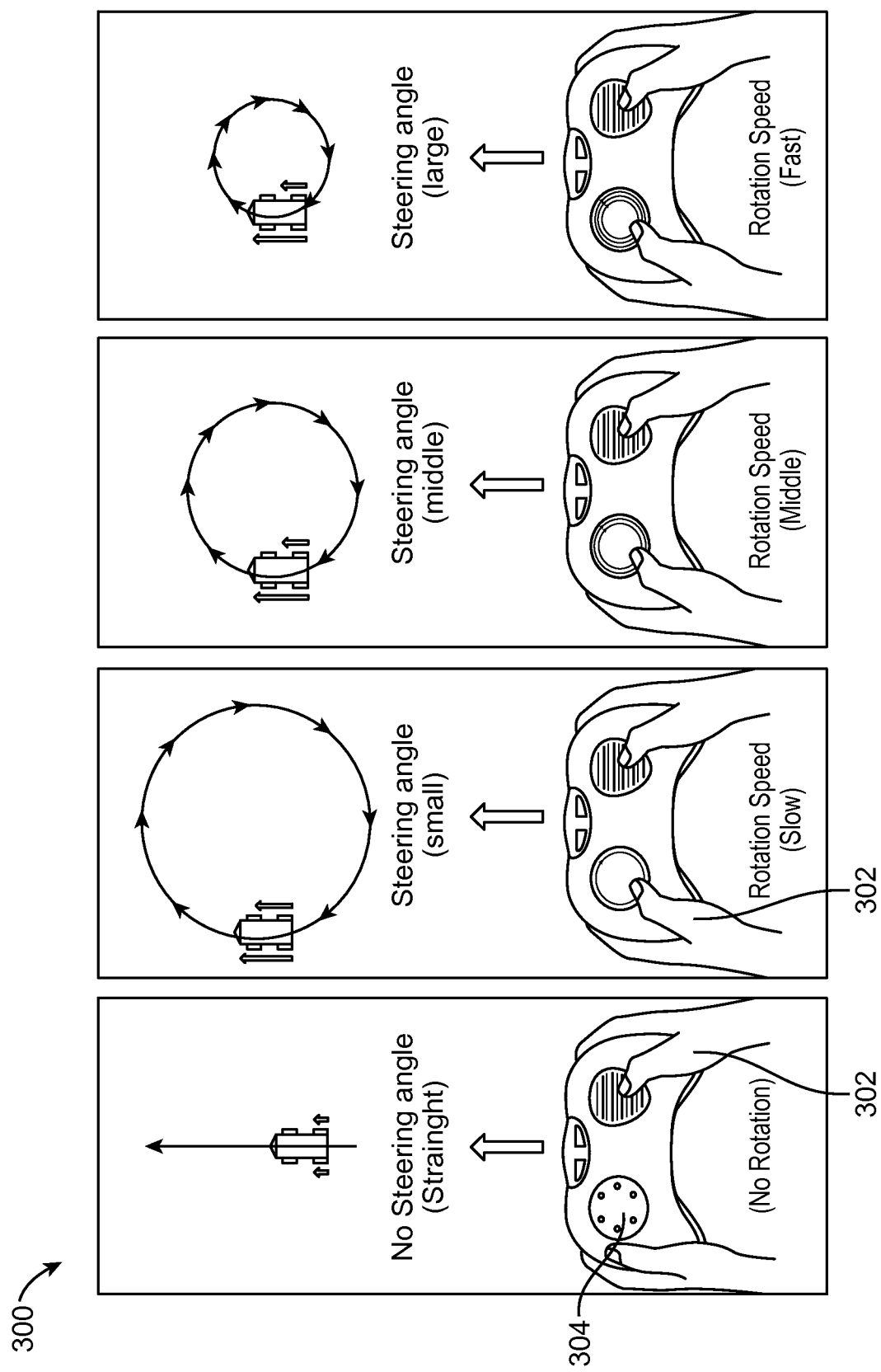
FIG. 3 is another block diagram to show relation of the rotation speed with the steering angle in accordance with a preferred embodiment of the present invention.

The steering angle is based on the rotational speed of the rotator unit 108 and the relationship in between the steering angle and the rotational speed is explained in detail in conjunction with FIG. 3 of the present invention. The disk shape of the rotator unit 108 provided orientation free steering to the user. The disk shape of the rotator unit 108 minimizes the orientation confusion for the player.

The disk shape of the rotator unit 108 further provides fast response in changing the steering direction from left to right or right to left, especially when the vehicle housing 112 is moving backwards. Further, the disk shape of the rotator unit 108 provides fast response as the user 101 may easily and quickly change the steering direction by moving their finger to control the vehicle direction in short time.

In another preferred embodiment of the present invention, the remote control unit includes one or more direction keys (not shown in FIG. 1) configured on the remote control housing 106 to release directional signals to be decoded by the receiver to determine the steering power. The direction keys moves the vehicle housing 112 in left, right, forward and backward direction.

The vehicle unit 104 communicates with the remote control unit 102. The remote vehicle unit 104 includes a receiver (not shown in FIG. 1) to decode the rotational pulse and the speed signals received from the transmitter (not shown in FIG. 1). The receiver (not shown in FIG. 1) then decodes the rotational pulse to determine the steering power. The steering power is explained in detail in conjunction with FIG. 3 of the present invention.

The vehicle unit 104 further includes a vehicle housing 112 and one or more wheels such as 114a, 114b, 114c and 114d, a motor unit (not shown in FIG. 1) attached to the wheels 114 to drive the vehicle housing 112 based on the steering power decoded by the receiver (not shown in FIG. 1). Examples of the vehicle housing 112 includes but not limited to airplane, ship, quadcopter, ducks, figurine, car, tank, truck, jeep, any other vehicle having at least one wheel.

Figure 2:
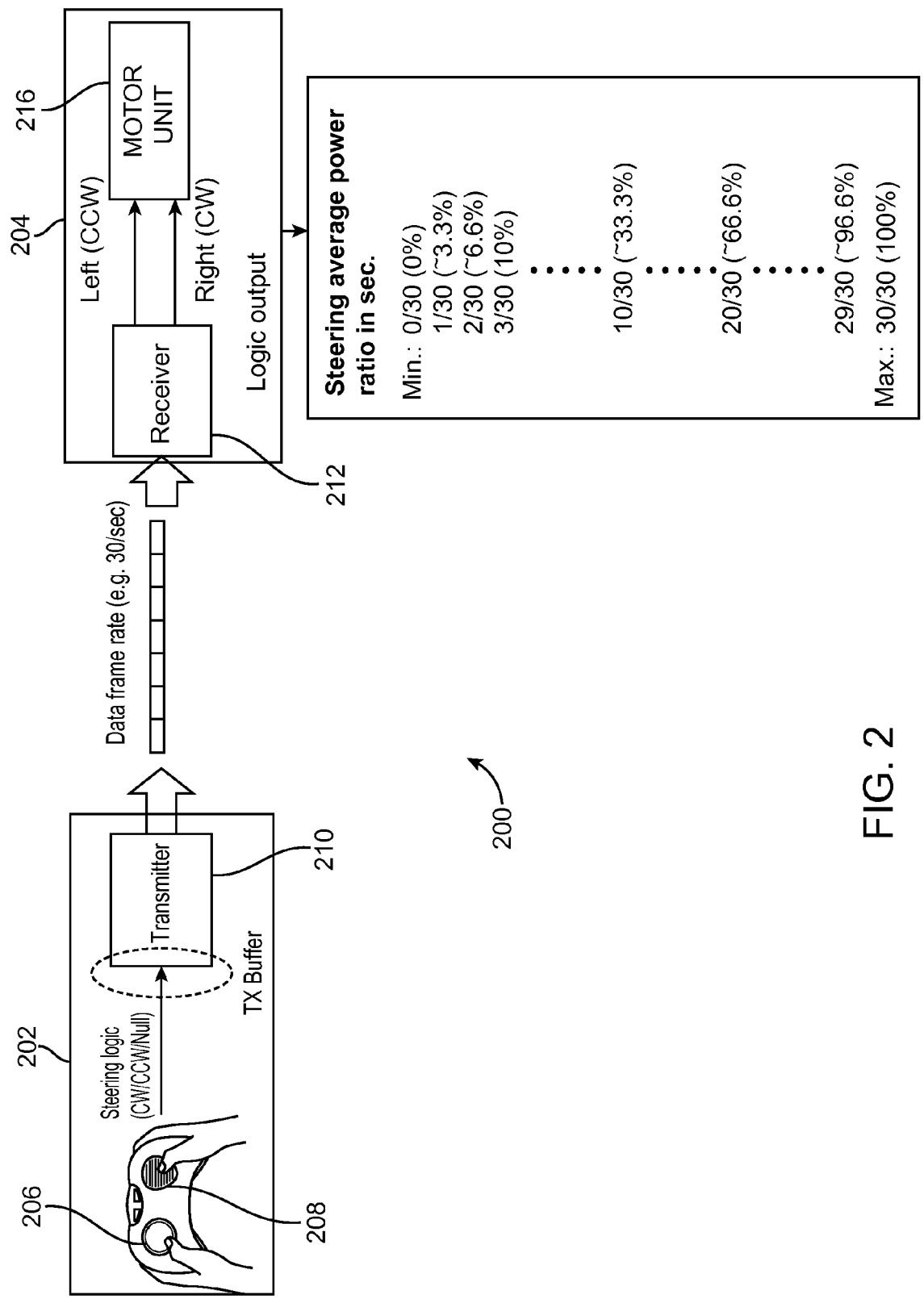
FIG. 2 is a block diagram for showing the integration of the remote control unit with the vehicle unit in accordance with a preferred embodiment of the present invention.

The motor unit (not shown in FIG. 1) is explained in detail in conjunction with FIG. 2 of the present invention. The vehicle unit 104 further includes a second power source (not shown in FIG. 1) to power the receiver and the motor unit. Further, the rotational pulse generated from the rotator unit 108 is directly proportional to the steering power decoded by the receiver (not shown in FIG. 1). The relationship in between the rotational pulse and steering power is explained in detail in conjunction with FIG. 3 of the present invention.

In another preferred embodiment of the present invention, the vehicle unit 104 further includes one or more visual unit 116 configured in the vehicle housing 112 to release visual signals on receiving power from the second power source (not shown in FIG. 1). In a preferred embodiment of the present invention, the one or more visual units 116 are LED lights. However, it would be readily apparent to those skilled in the art that various forms of visual unit 116 may be used without deviating from the scope of the present invention.

In another preferred embodiment of the present invention, the vehicle unit 104 further includes one or more audio unit 116 configured in the vehicle housing 112 to release audio signals on receiving power from the second power source (not shown in FIG. 1). In a preferred embodiment of the present invention, the one or more audio units 116 are speakers. However, it would be readily apparent to those skilled in the art that various forms of audio unit 116 may be used without deviating from the scope of the present invention.

FIG. 2 is a block diagram 200 for showing the wireless integration of the remote control unit 202 with the vehicle unit 204 in accordance with a preferred embodiment of the present invention. The rotator unit 206 and speed control switches 208 releases rotational pulses and speed signals and further transmitted by the transmitter 210.

The rotational pulses may either be clock-wise (CW), counter-clock wise (CCW) or may be neutral direction (Null). The transmitter 210 then transmits the data frame rate to the receiver 212. The receiver 212 then decodes the data frame rate to steering power and thus drives the motor unit to drive the wheels in either clock-wise (CW), counter-clock wise (CCW) or neutral direction (Null).

In an exemplary embodiment, the data frame rate of transmitter 210 is 30 frames/second, and thus the steering information produced by rotating the rotator unit 208 is decoded as 30 times/sec by the receiver 212. Thereafter, the receiver provides the steering power to the motor unit 214 i.e. steering power output (left/right) may be produce from 0/30 min to 30/30 max steering power level per second.

Thus, as shown in FIG. 2, the steering average power is Min. 0/30 (0%), 1/30 (~3.3%), 2/30 (~6.6%) . . . 10/30 (~33.3% . . . 20/30 (~66.6%) . . . 29/30 (~96.6%) and maximum of 30/30 (100%). The relation between the rotating disk speed and steering angle in the motor unit 214 is explained in detail in conjunction with FIG. 3 of the present invention.

In a preferred embodiment of the present invention, the motor unit 214 is a differential driving system. However, it would be readily apparent to those skilled in the art that various forms of motor unit 214 such as separate steering and driving system may be used to drive the housing 204. The mechanism is also known as tank movement mechanism.

In differential driving system, there are two motors, one is installed at the left wheel and another is installed at the right wheel assembly respectively, to provide different motor power to produce movements. However, in separated steering and driving system, there is one motor for forward and backward movements, and other motor (or solenoid) is responsible for steering only. The mechanism is similar to vehicle movement mechanism.

FIG. 3 is another block diagram 300 to show relation of the rotation speed with the steering angle in accordance with an exemplary embodiment of the present invention. The rotation speed is generated by the user 302 by rotating the rotator unit 304 and the steering angle is generated by the motor unit attached to the wheels of the vehicle unit. With reference to FIG. 1, the rotational pulse is directly proportional to the steering power.

In an exemplary embodiment, when the rotation speed is null, then the steering angle is straight, and thus the vehicle unit moves in straight direction. Further, if the rotation speed is slow then the steering angle is small. Thus, it means the vehicle unit takes a bigger round, when the user slowly rotates the rotator unit.

Further, if the rotation speed is middle then the steering angle is middle and furthermore, when the rotation speed is fast, then the steering angle is large. Thus, with the fast rotation of the rotator unit, the vehicle takes a fast/sharp turn.

Further, when the vehicle is moving in backward direction, the direction of rotational pulse generated from the rotator unit is invert the logic of the steering power decoded by the receiver.

For example: When the vehicle is moving forward, the vehicle direction depending upon the direction of the rotational pulse is as follows:
 a) Remote (CW)→Vehicle (CW)
 b) Remote (CCW)→Vehicle (CCW)
Whereas, when the vehicle is moving backward, the vehicle direction depending upon the rotational pulse is as follows:
 a) Remote (CW)→Vehicle (CCW)
 b) Remote (CCW)→Vehicle (CW)

The present invention offer various advantages such as toys for children that are controlled by the remote. This vehicle combination may be used in toys such as racing car, robots, vehicle etc. Further, the present invention may be used in industrial and military field for transportation. The vehicle combination has an orientation free driving system and thus easy to control.

There has thus been shown and described the vehicle combination for providing orientation free steering experience to a user. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A vehicle combination for providing orientation free steering experience to a user, the vehicle combination comprising:
 a remote control unit comprising:
  a remote control housing handheld by the user;
  a first power source configured within the housing to provide power;
  at least one disk shaped rotator unit powered by the first power source and operated by the user to generate a coded rotational pulse, the disk shaped rotator unit configured on the remote control housing;
  one or more speed control switches powered by the first power source to release speed signals; and
  a transmitter powered by the first power source to transmit the generated rotational pulse received from the rotator unit and further transmits the speed signals received from the speed control switches; and
 a vehicle unit wirelessly communicating with the remote control unit comprising:
  a receiver to decode the rotational pulse and the speed signals wirelessly received from the transmitter, further converts the decoded rotational pulse to determine the steering power;
  a vehicle housing;
  one or more wheels attached to the vehicle housing;
  a motor unit attached to the wheel to drive the vehicle housing based on the steering power decoded by the receiver; and
  a second power source to power the receiver and the motor unit;
 wherein the rotational pulse generated from the rotation of disk shaped rotator unit is directly proportional to the steering power decoded by the receiver to provide orientation free steering.

2. The rotator unit according to claim 1 further comprising:
 a rotator encoder to generate electrical signals; and
 a steering decoder to convert the electrical signals into coded rotational pulse.

3. The vehicle combination according to claim 1 further comprising one or more direction keys configured in the remote control housing to release directional signals for directing the movement of the housing, wherein the directional signals decoded by the receiver to determine the steering power.

4. The vehicle combination according to claim 1 further comprising a monostable circuit unit to control the timing of each rotational pulse generated from the rotator unit.

5. The vehicle combination according to claim 1 further comprising one or more visual units configured in the vehicle housing to illuminate visual signals on receiving power from the second power source.

6. The vehicle combination according to claim 1 further comprising one or more audio units configured in the vehicle housing to release audio signals on receiving power from the second power source.

7. The vehicle combination according to claim 1 wherein the direction of rotational pulse generated from the rotator unit is invert the logic of the steering power decoded by the receiver, when the vehicle housing is moving in backward direction.

* * * * *